(12) United States Patent
Chen (10) Patent No.: US 7,845,058 B2
(45) Date of Patent: Dec. 7, 2010

(54) METHOD FOR ASSEMBLING CAMERA MODULE

(75) Inventor: Ying-Chih Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 651 days.

(21) Appl. No.: 11/925,304

(22) Filed: Oct. 26, 2007

(65) Prior Publication Data
US 2008/0307626 A1 Dec. 18, 2008

(30) Foreign Application Priority Data
Jun. 18, 2007 (CN) .................. 2007 1 0200832

(51) Int. Cl.
*B23Q 17/00* (2006.01)
*G03B 17/00* (2006.01)

(52) U.S. Cl. .............. 29/407.01; 29/407.04; 29/407.09; 29/407.1; 396/529

(58) Field of Classification Search .............. 29/407.01, 29/407.04, 407.09, 407.1, 525.01, 525.02, 29/525.11, 833; 356/139.04, 139.05; 396/529, 396/533
See application file for complete search history.

(56) References Cited

U.S. PATENT DOCUMENTS
2006/0042064 A1  3/2006  Montfort et al.

FOREIGN PATENT DOCUMENTS
CN           1959519 A    5/2007

*Primary Examiner*—Jermie E Cozart
(74) *Attorney, Agent, or Firm*—Jeffrey T. Knapp (57) ABSTRACT

An exemplary method for assembling a lens unit and a light-receiving unit into a camera module is provided. The lens unit includes a mountable surface. The light-receiving unit includes a light-receiving surface and a mounting surface. The method includes a mountable surface detecting step, a mountable surface repositioning step, a mounting surface detecting step, a mounting surface repositioning step, and a mounting step. The mountable surface detecting and repositioning steps detect and reposition the lens unit to make the mountable surface perpendicular to the optical axis of the lens unit. The mounting surface detecting repositioning steps detect and reposition the light-receiving unit to make the mounting surface parallel to the light-receiving surface. The mounting step mounts the light-receiving unit to the lens unit in the manner that the mounting surface parallel to the light-receiving surface is biased against the mountable surface perpendicular to the optical axis.

14 Claims, 9 Drawing Sheets

METHOD FOR ASSEMBLING CAMERA MODULE

BACKGROUND

1. Technical Field

The invention relates to image technology and, particularly, relates to a method for assembling a camera module.

2. Description of Related Art

A camera module includes a lens unit and a light-receiving unit. The lens unit includes a lens barrel and pickup lenses received/held in the lens barrel, the lens barrel defines a mountable/attachable surface. The light-receiving unit includes a carry plate and an imaging sensor fixed on the carry plate, the carry plate defines a mounting surface. Assembling the camera module is typically carried out by assembling the lens barrel, the pickup lenses and other components into the lens unit, and assembling the imaging sensor, the carry plate, and other components into the light-receiving unit; assembling the lens unit and the light-receiving unit into the camera module; taking test images to check the image quality of the camera module, hereafter referred as "coaxial qualification": the optical axis of the pickup lenses is perpendicular to the light-receiving surface of the imaging sensor; disassembling the camera module and repositioning either the mountable surface or mounting surface if the camera module is judged not to satisfy the coaxial qualification; and cycling through the assembling-testing-disassembling-repositioning steps until the camera module is judged to satisfy the coaxial qualification.

The problems of the abovementioned assembling are: (1) cycling through the assembling-testing-disassembling-repositioning steps is time-consuming, and readily damages the camera module; and (2) the lens unit and the light-receiving unit should be one-to-one matched, namely, the lens unit/light-receiving unit can not be directly replaced by another lens unit/light-receiving unit, a reworkablity of the camera module is less than optimal.

Therefore, it is desirable to provide a method for assembling a camera module, which can overcome the abovementioned problems.

SUMMARY

In a present embodiment, a method for assembling a lens unit and a light-receiving unit in a camera module is provided. The lens unit includes a mountable surface. The light-receiving unit includes a light-receiving surface and a mounting surface. The method includes the steps of: detecting whether the mountable surface is perpendicular to the optical axis of the lens unit; repositioning the mountable surface to make the mountable surface perpendicular to the optical axis if the mountable surface is judged not to be perpendicular to the optical axis; cycling through the mountable surface detecting step and the mountable surface repositioning step until the mountable surface is judged to be perpendicular to the optical axis in the mountable surface detecting step; detecting whether the mounting surface is parallel to the light-receiving surface; repositioning the mounting surface to make the mounting surface parallel to the light-receiving surface if the mounting surface is judged not to be parallel to the light-receiving surface; cycling through the mounting surface detecting step and the mounting surface repositioning step until the mounting surface is judged to be parallel to the light-receiving surface in the mounting surface detecting step; and mounting the light-receiving unit to the lens unit in the manner that the mounting surface parallel to the light-receiving surface is pushed against the mountable surface perpendicular to the optical axis.

BRIEF DESCRIPTION OF THE DRAWINGS

Many aspects of the present method should be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION OF THE EMBODIMENTS

Embodiments of the present method will now be described in detail with the references to the drawings.

Figure 1:
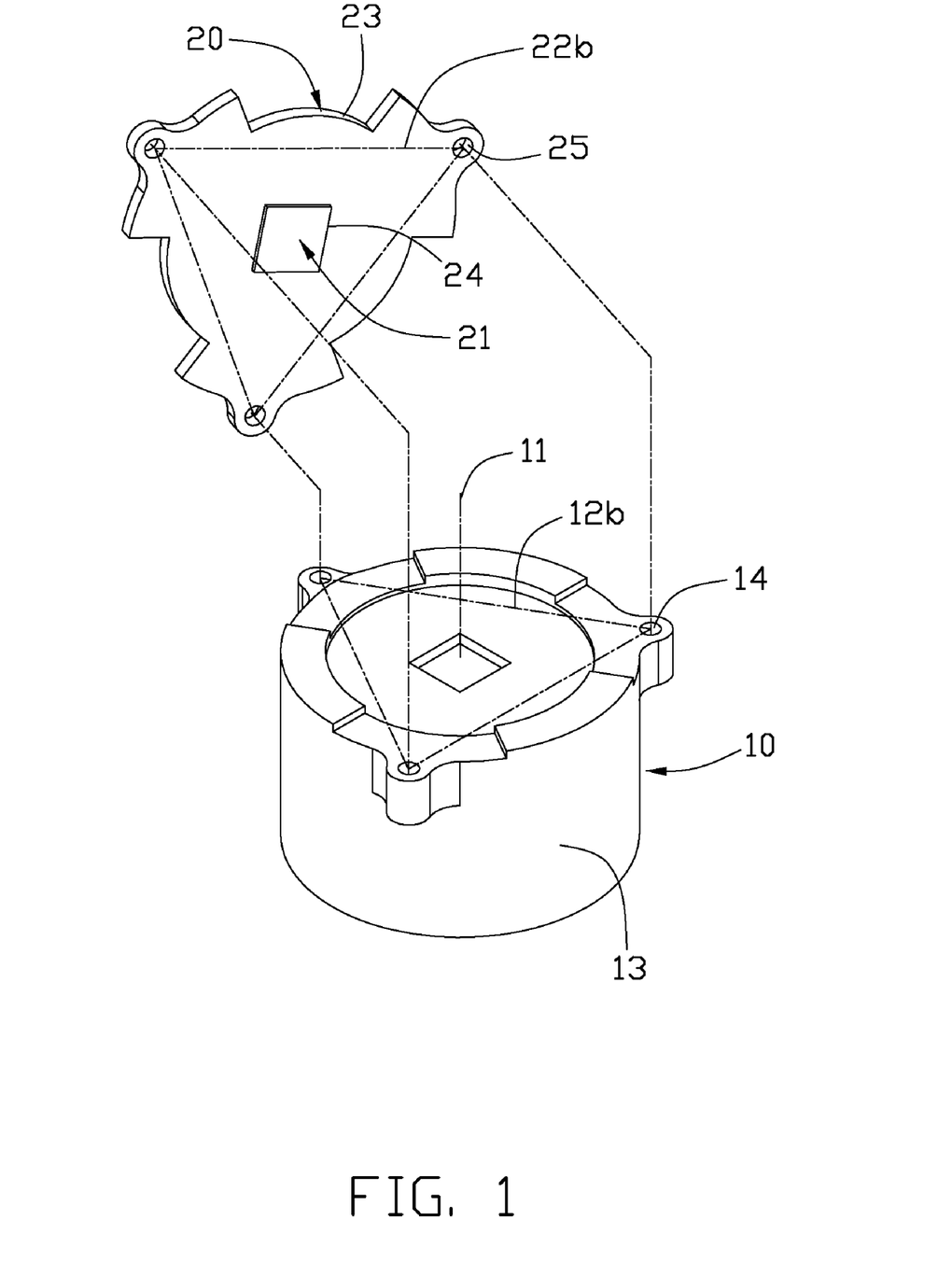
FIG. 1 is an isometric, exploded view of a camera module to be assembled by a method of an exemplary embodiment.
Figure 2:
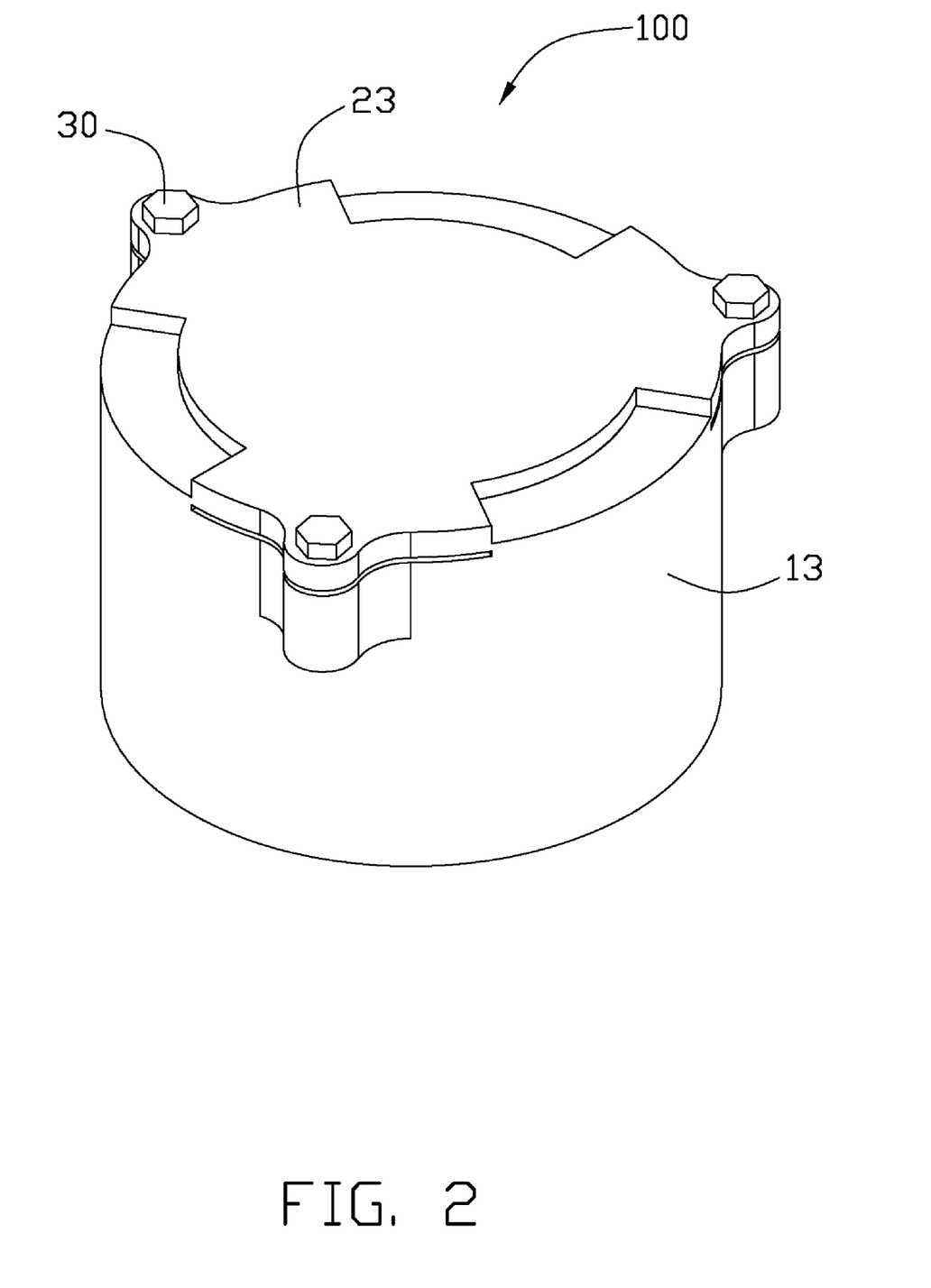
FIG. 2 is an isometric, assembled view of the assembled camera module of FIG. 1.

Referring to FIG. 1, a method of an exemplary embodiment is adapted for assembling a lens unit 10 and a light-receiving unit 20 in a camera module 100 (see FIG. 2). The lens unit 10 includes a mountable surface 12b. The light-receiving unit 20 includes a light-receiving surface 21, and a mounting surface 22b. In particular, the lens unit 10 further includes a lens barrel 13, and arrangement of pickup lenses, shutter, zooming/focusing system and so on (not shown) received in the lens barrel 13. The lens barrel 13 defines three screw holes 14 in the mountable surface 12b of the lens unit 10. The light-receiving unit 20 includes a mounting plate 23 and a light-receiving element 24 (e.g., charge coupled device). The mounting plate 23 is sized so as to seal the end of the lens barrel 13 opposing/facing the lens unit 10. The light-receiving element 24 is fixed on the mounting plate 23, and is positioned so as to, upon assembly, be received in the lens barrel 13. The mounting plate 23 defines three through holes 25 in the mounting surface 22b, each through hole 25 is positioned so as to, upon assembly, align with the respective screw hole 14. The light-sensitive surface of the light-receiving element 24 is the light-receiving surface 21 of the light-receiving unit 20. It should be noted the number of screw holes 14 and through holes 25 is not limited to three.

Generally, because of limited precision in manufacturing, the mountable surface 12b (without repositioning) will not be precisely perpendicular to the optical axis 11, and the mounting surface 22b (without repositioning) will not be precisely parallel to the light-receiving surface 21, which is a shortcoming that can be resolved in the following way.

Figure 3:
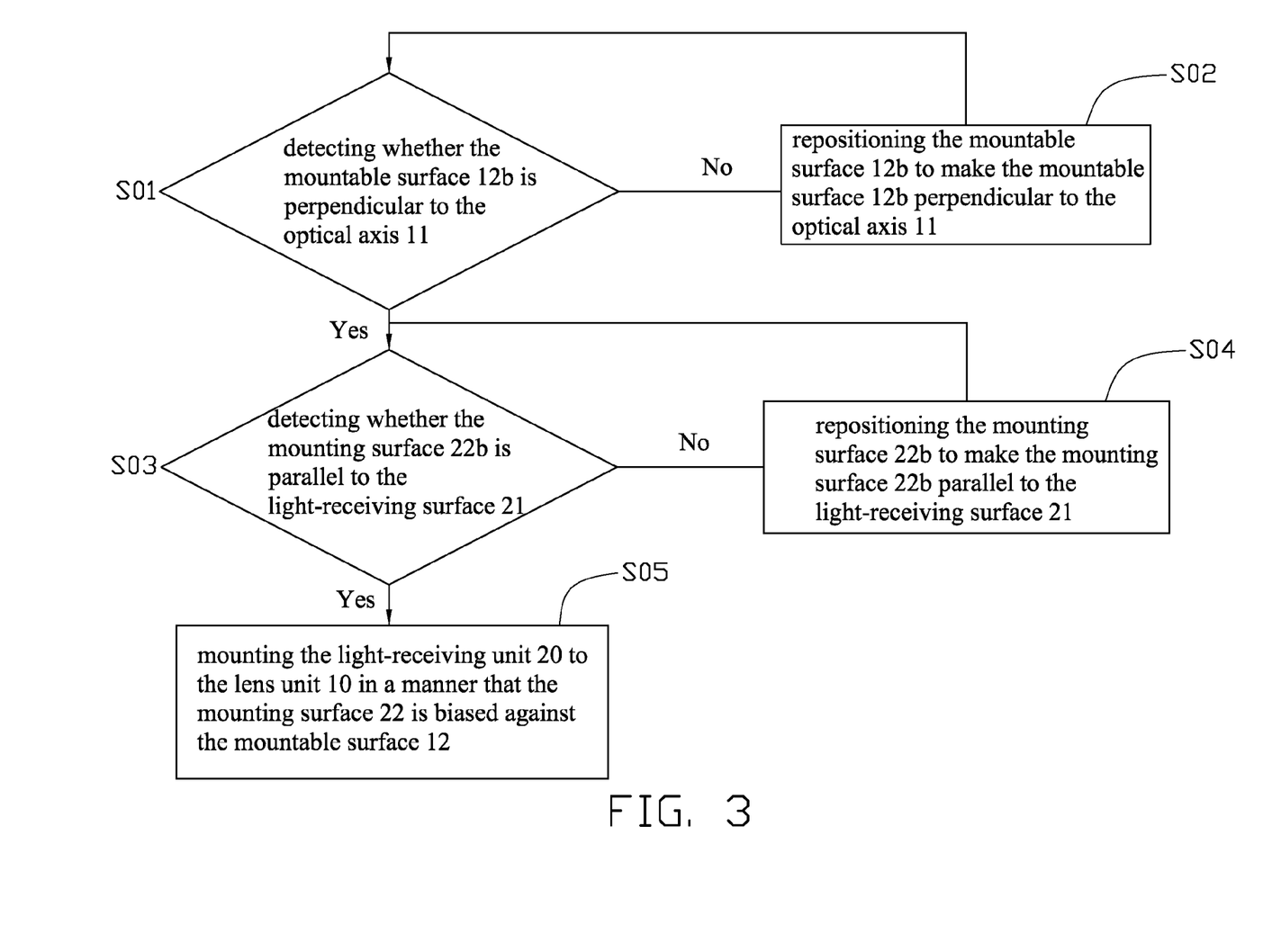
FIG. 3 is a flow-chart of the method, according to the exemplary embodiment.
Figure 4:
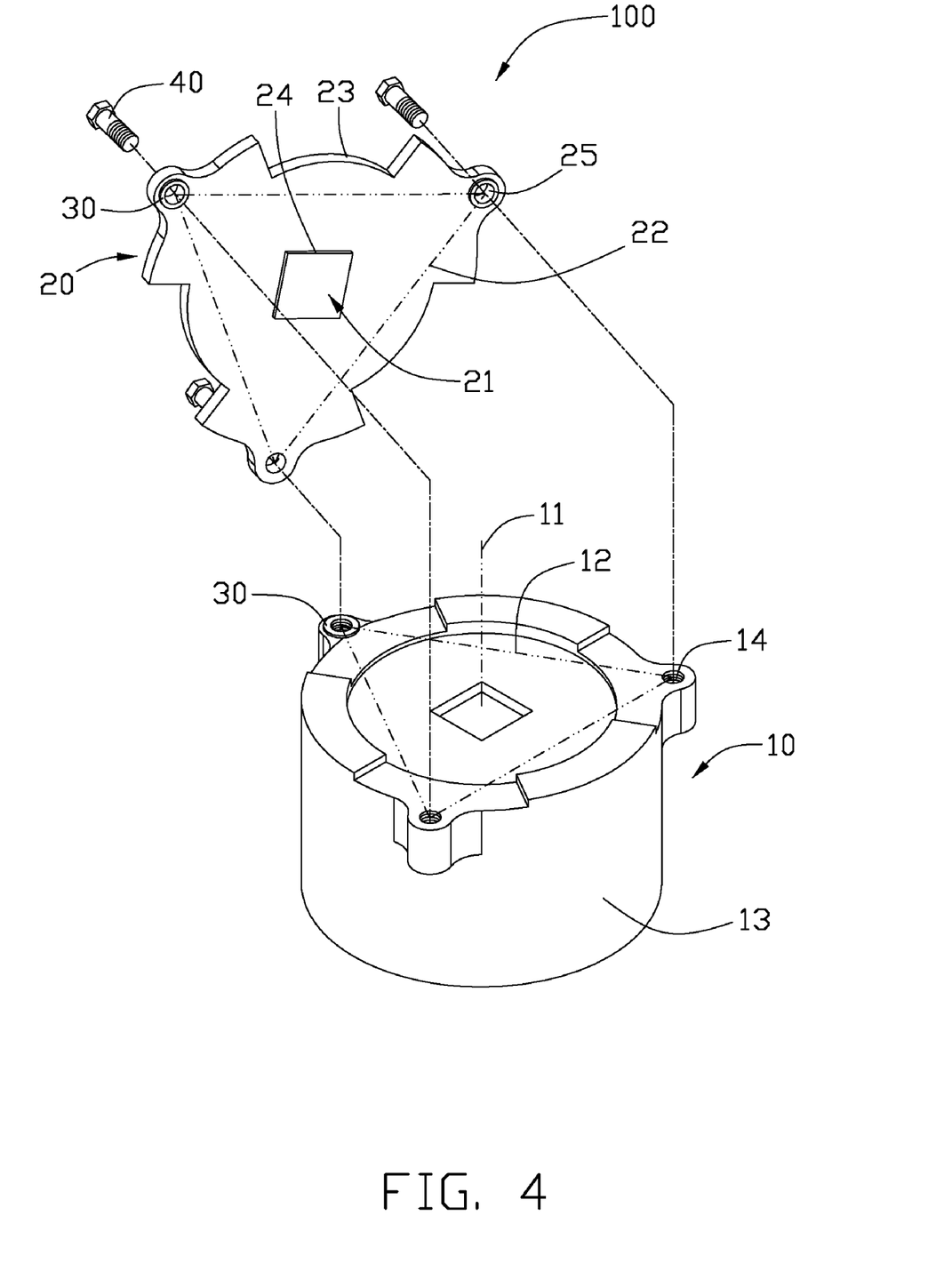
FIG. 4 is an isometric, exploded view of the assembled camera module of FIG. 2.

Also referring to FIG. 3 and FIG. 4, the method for assembling the lens unit 10 and the light-receiving unit 20 in the camera module 100 includes the steps of:

S01: detecting whether the mountable surface 12b is perpendicular to the optical axis 11;

S02: repositioning the mountable surface 12b to make the mountable surface 12b perpendicular to the optical axis 11 if the mountable surface 12b is judged not to be perpendicular to the optical axis 11; cycling through the mountable surface detecting step and the mountable surface repositioning step to precisely position the mountable surface 12 perpendicular to the optical axis 11;

S03: detecting whether the mounting surface 22b is parallel to the light-receiving surface 21;

S04: repositioning the mounting surface 22b to make the mounting surface 22b parallel to the light-receiving surface 21 if the mounting surface 22b is judged not to be parallel to the light-receiving surface 21; cycling through the mounting surface detecting step and the mounting surface repositioning step to precisely position the mounting surface 22 parallel to the light-receiving surface 21; and S05: mounting the light-receiving unit 20 to the lens unit 10 in a manner that the mounting surface 22 is biased against the mountable surface 12.

Figure 5:
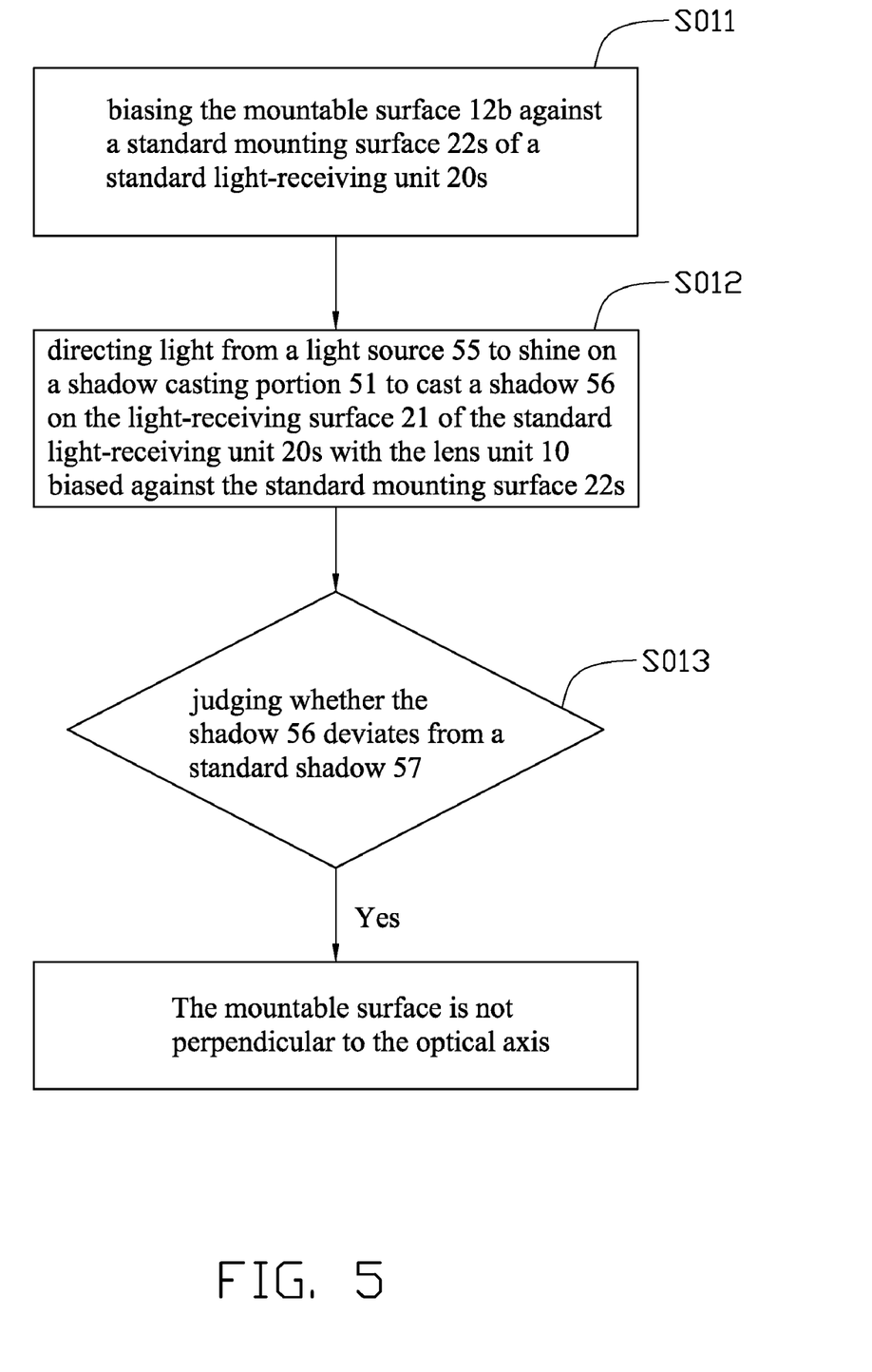
FIG. 5 is a sub-flow chart of the method in accordance with the exemplary embodiment.
Figure 6:
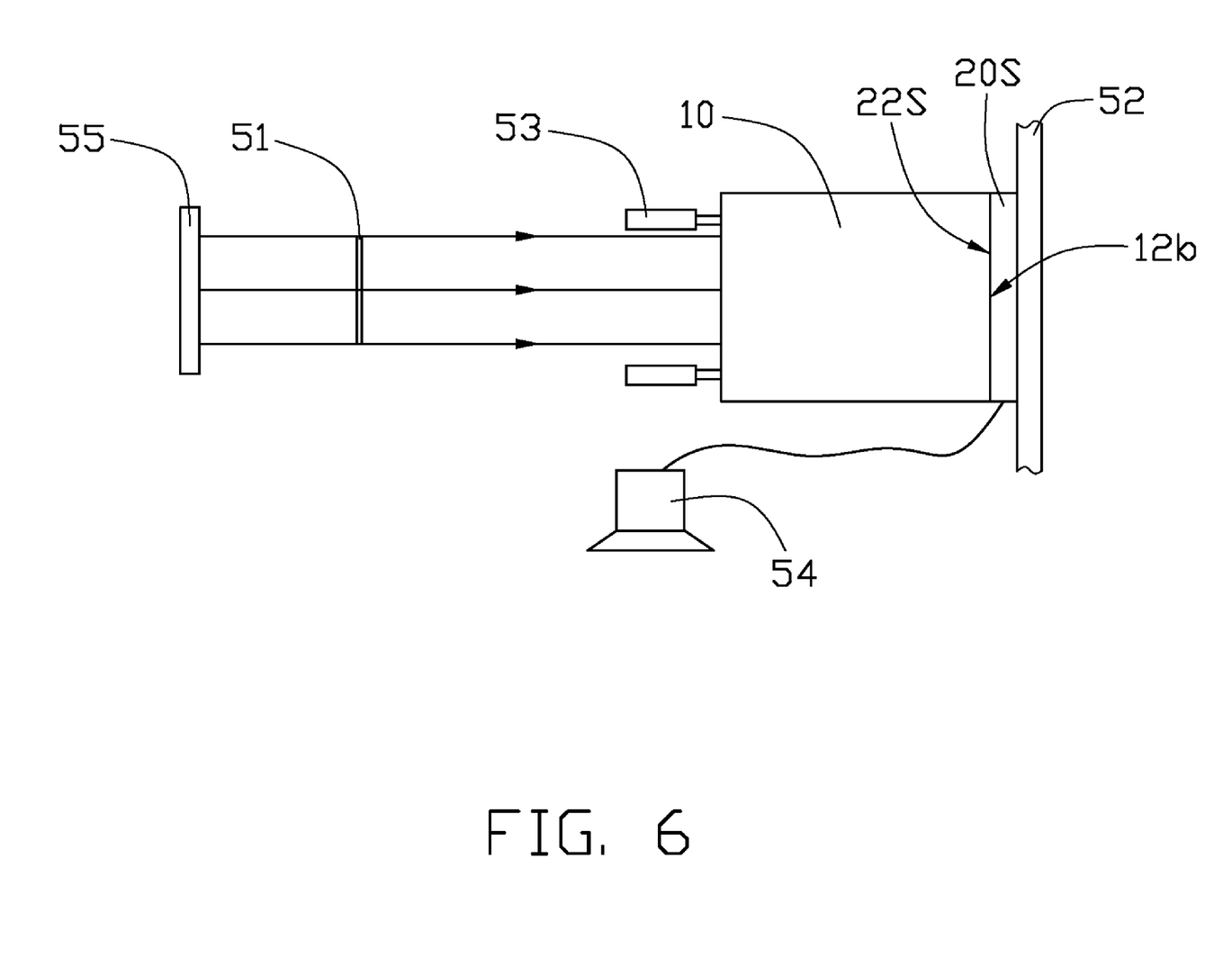
FIG. 6 is a schematic, planar view of a detecting system used by the method, according to the exemplary embodiment.

Referring to FIG. 5 and FIG. 6, the step S01 (mountable surface detecting step) includes the sub-steps of:

S011: biasing the mountable surface 12b against a standard mounting surface 22s of a standard light-receiving unit 20s; the standard mounting surface 22s is parallel to the light-receiving surface of the standard light-receiving unit 20s. As exemplary, the step S011 is carried out by: (1) fixing the standard light-receiving unit 20s to a base/holder 52; (2) placing the lens unit 10 onto the standard light-receiving unit 20s in a manner that the mountable surface 12b is in contact with the standard mounting surface 22s; and (3) biasing the lens unit 10 against the standard mounting surface 22s using three or more ejector pins 53.

Figure 7:
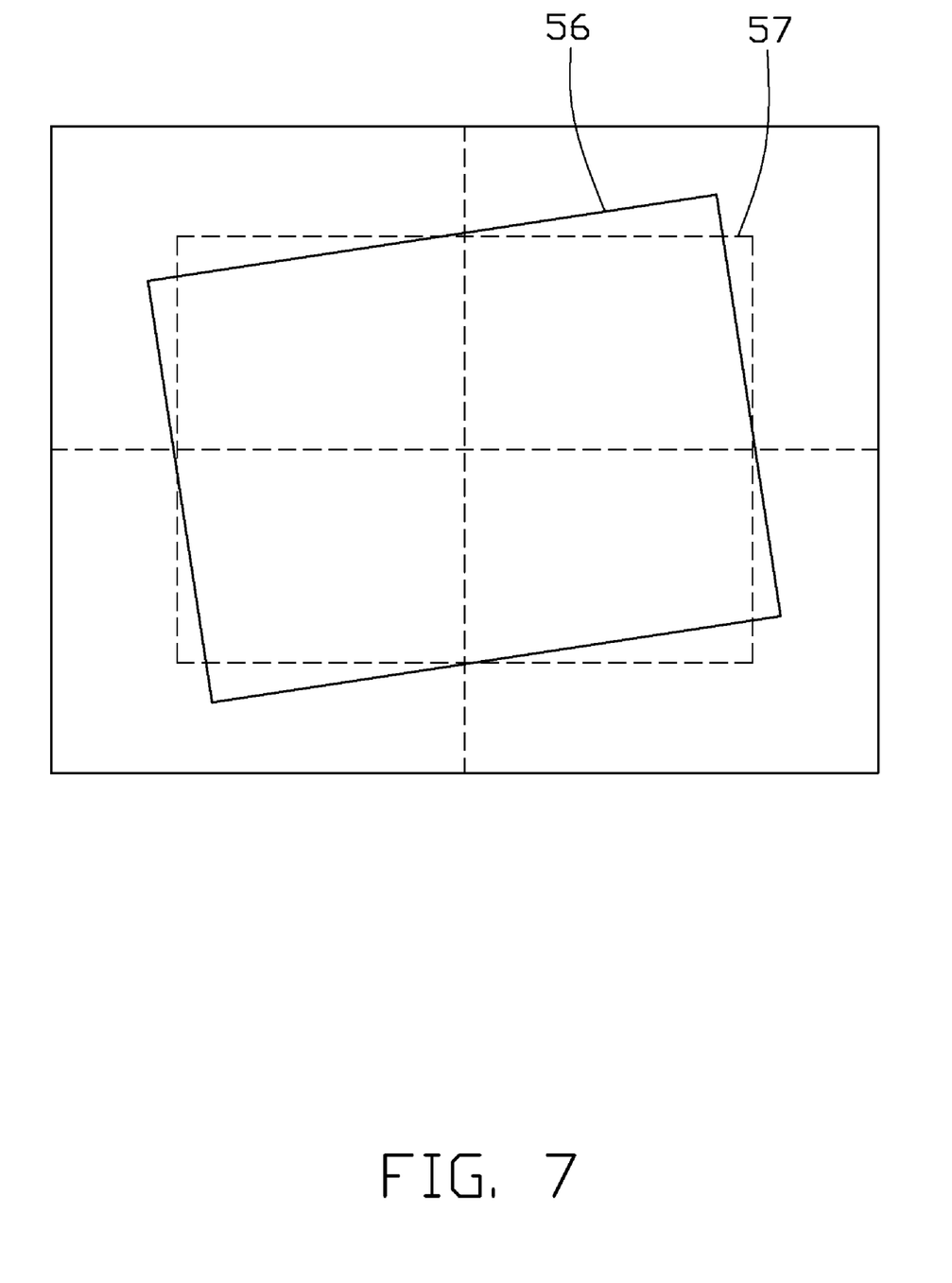
FIG. 7 is a schematic view showing a detected result of the method, according to the exemplary embodiment.

S012: directing light from a light source 55 to shine on a shadow casting portion 51 to cast a shadow 56 (see FIG. 7) on the light-receiving surface 21 of the standard light-receiving unit 20s with the lens unit 10 biased against the standard mounting surface 22s. Specifically, the lens unit 10 is activated to expose the standard light-receiving unit 20s the shadow 56 (see FIG. 7), to be displayed by a display device 54 (e.g., liquid crystal display). The shadow casting portion 51 is advantageously made of a shaped planar wire and is set opposing/facing the lens unit 10 to get a high resolution (position identifiability) of the shadow 56. In this embodiment, the shadow casting portion 51 is a rectangular planar wire; and S013: judging whether the shadow 56 deviates from a standard shadow 57 (see FIG. 7) by super positioning images of the two shadows 56, 57 in the display 54, the standard shadow 57 is formed by exposing on the light-receiving surface 21 of the standard light-receiving unit 20s with a standard lens unit 10 biased against the standard mounting surface 22s to a shadow cast by the shadow casting portion 51 and the resulting image is then stored in a memory (not shown) of the display 54. The standard lens unit 10s includes a standard mountable surface 12s perpendicular to the optical axis 11 thereof. If the shadow 56 is judged to deviate from the standard shadow 57, the mountable surface 12b is not perpendicular to the optical axis 11. Alternatively, the standard shadow 57 also can be a labeled mark on a corresponding position of the screen of the display device 56.

Referring back to FIG. 4, if the shadow 56 is judged to deviate from the standard shadow 57, the step S02 (mountable surface repositioning step) is carried out by: uninstalling the lens unit 10; attaching at least one respective washer 30 over a corresponding screw hole 14 depending on the deviation between the shadow 56 and the standard shadow 57 (i.e., the offset/displacement and orientation of the shadow 56 with respect to the standard shadow 57). How many, height of the respective washer 30, and where (which screw hole) a respective washer 30 should be attached can be decided by the visual inspector. The washer 30 is attached over the respective screw hole using adhesive.

After repositioning, the lens unit 10 goes through the step S01 (mountable surface detecting step) again, and is cycled through the step S01 (mountable surface detecting step) and the step S02 (mountable surface repositioning step) until the mountable surface 12 is judged to be perpendicular to the optical axis 11.

It is to be understood that, after repositioning, if the mountable surface 12b is judged to be perpendicular to the optical axis 11, the mountable surface 12b is the mountable surface 12; if the mountable surface 12b is judged not to be perpendicular to the optical axis 11, the mountable surface 12 is different from the mountable surface 12b in that at least one washer is placed over one of the screw holes 14.

Figure 8:
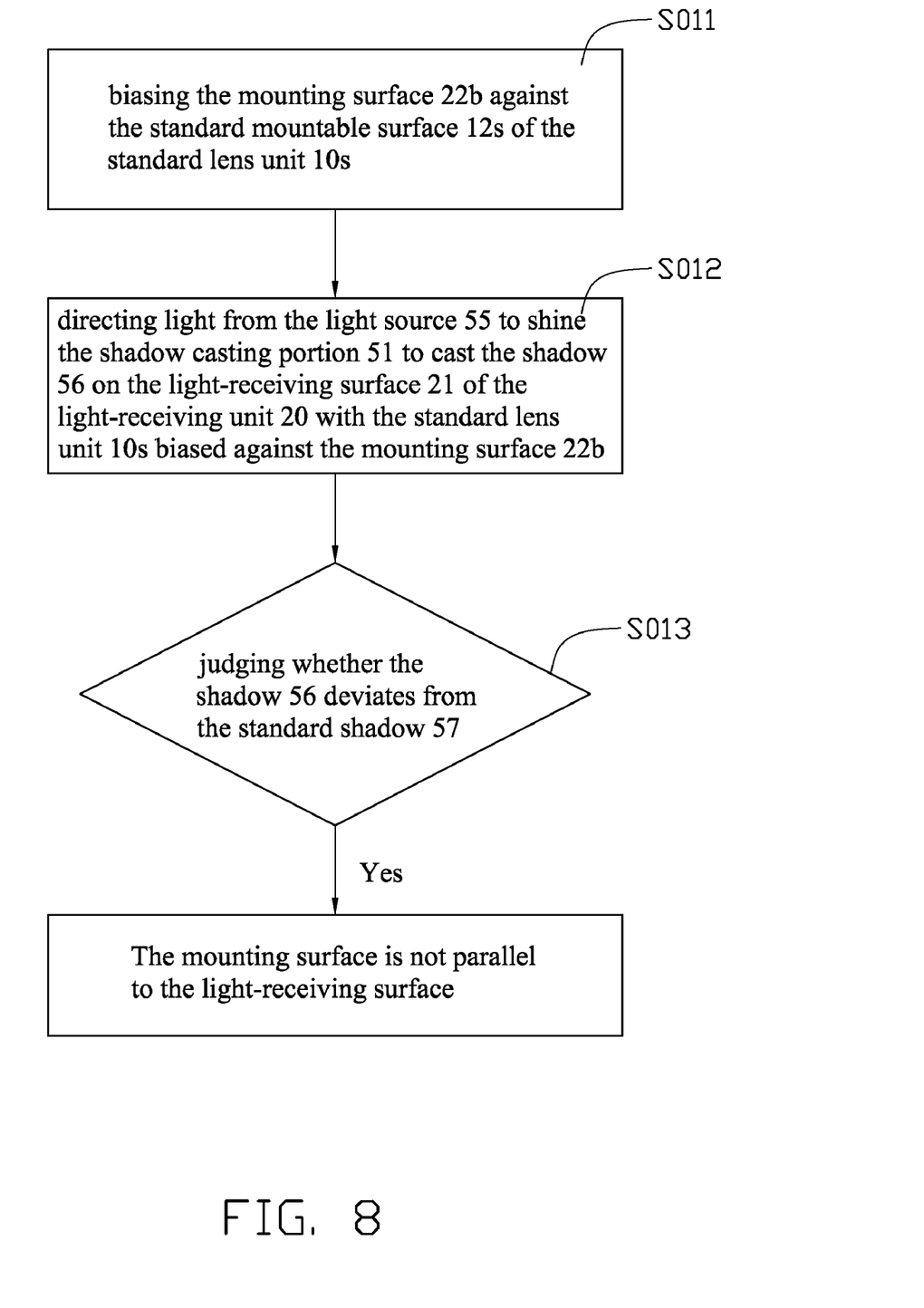
FIG. 8 is another sub-flow chart of the method in accordance with the exemplary embodiment.
Figure 9:
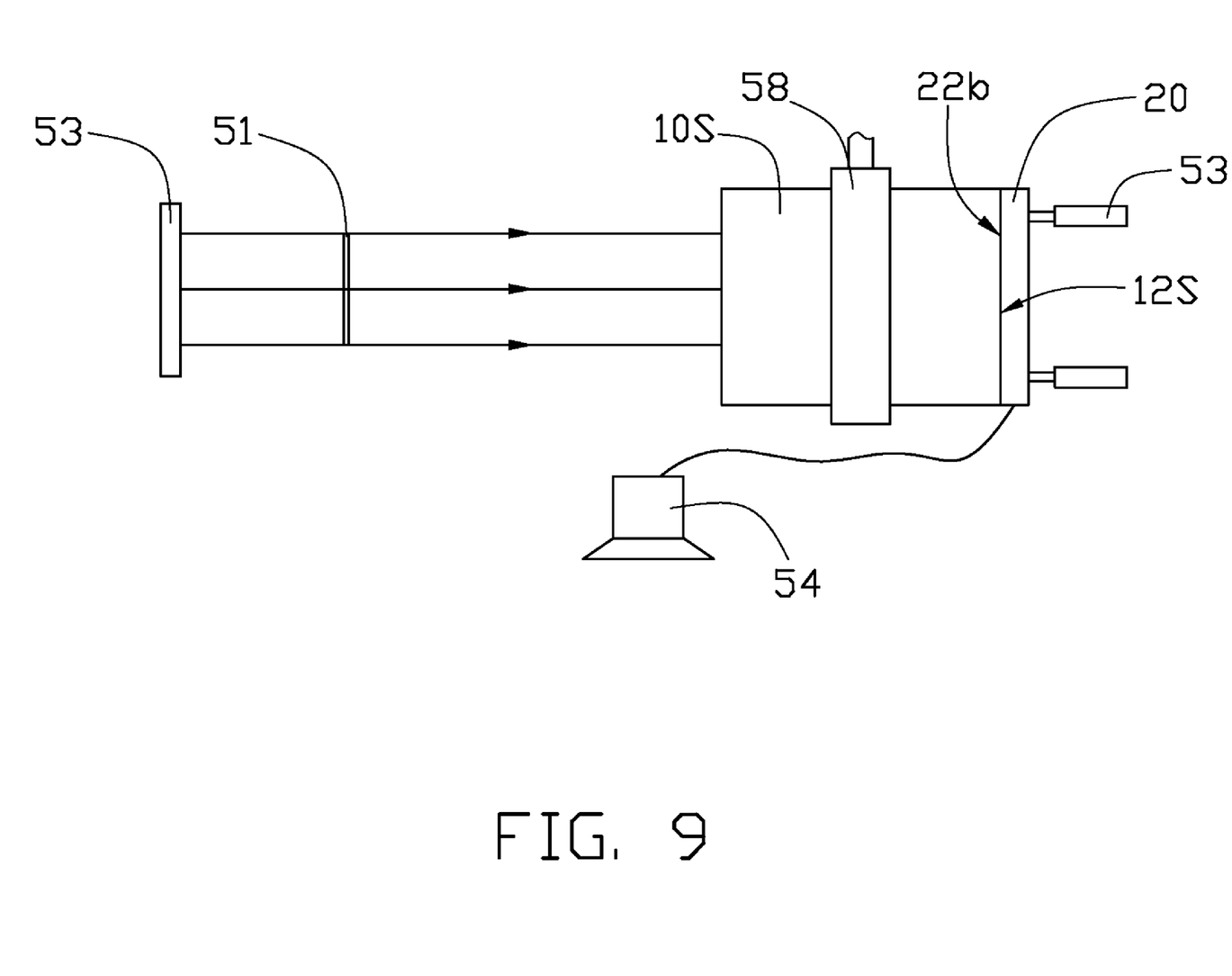
FIG. 9 is schematic, planar view of another detecting system used by the method, according to the exemplary embodiment.

Referring to FIG. 8 and FIG. 9, the step S03 (mounting surface detecting step) is essentially similar to the step S01 (mountable surface detecting step), and includes the sub-steps of:

S031: biasing the mounting surface 22b against the standard mountable surface 12s of the standard lens unit 10s, the standard lens unit 10s is fixed to a holder 58.

S032: directing light from the light source 55 to shine on the shadow casting portion 51 to cast the shadow 56 onto the light-receiving surface 21 of the light-receiving unit 20 with the standard lens unit 10s biased against the mounting surface 22b; and S033: judging whether the shadow 56 deviates from the standard shadow 57. If the shadow 56 is judged to deviate from the standard shadow 57, the mounting surface 22b is not parallel to the light-receiving surface 21.

Referring back to FIG. 4 again, if the shadow 56 is judged to deviate from the standard shadow 57, the step S04 (mounting surface repositioning step) is carried out by: uninstalling the light-receiving unit 20; attaching at least one respective washer 30 onto at least one respective edge of at least one through hole 25 facing the lens unit 10, depending on location and amount of deviation. After repositioning, the light-receiving unit 20 goes through the step S03 (mounting surface detecting step) again, and is cycled through the step S03 (mounting surface detecting step) and the step S04 (mounting surface repositioning step) until the mounting surface 22 is judged to be parallel to the light-receiving surface 21.

It should be noted that the standard lens unit 10s and the standard light-receiving unit 20s can be a precisely manufactured lens unit/light-receiving unit, or a lens unit/light-receiving unit repositioned by some other method, such as optical analysis method.

The step S05 (mounting step) is carried out by: sealing the end of the lens barrel 13 using the mounting plate 23 with alignment between the screw holes 14 and the through holes 25; inserting three bolts 40 through the through holes 25 and screwing the bolts 40 into the screw holes 14 to bias the mounting surface 22 against the mountable surface 12. Thereby, the camera module 100 is assembled.

Since the mountable surface 12 is perpendicular to the optical axis 11, and the mounting surface 22 is parallel to the light-receiving surface 21. The camera module 100 thus assembled satisfies the coaxial qualification.

The method respectively detects and repositions the lens unit 10 and the light-receiving unit 20 to qualify both of them, the lens unit 10 and the light-receiving unit 20 can be directly assembled to form the camera module 100 satisfying the coaxial qualification. Thus cycling through assembling-testing-disassembling-repositioning steps to get the camera module 100 is avoided. Additionally, because of how the lens units 10 and light-receiving units 20 are matched to each other, should one of the units 10, 20 become damaged it can be directly replaced by any other lens unit 10/light-receiving unit 20 (without further repositioning), the potential for successful repairs of the camera module 100 is improved.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A method for assembling a lens unit and a light-receiving unit in a camera module, the lens unit comprising a mountable surface, the light-receiving unit comprising a light-sensitive surface and a mounting surface, the method comprising the steps of:
    detecting whether the mountable surface is perpendicular to the optical axis of the lens unit;
    repositioning the mountable surface to make the mountable surface perpendicular to the optical axis if the mountable surface is judged not to be perpendicular to the optical axis;
    cycling through the mountable surface detecting step and the mountable surface repositioning step until the mountable surface is judged to be perpendicular to the optical axis in the mountable surface detecting step;
    detecting whether the mounting surface is parallel to a light-receiving surface;
    repositioning the mounting surface to make the mounting surface parallel to the light-receiving surface if the mounting surface is judged not to be parallel to the light-receiving surface;
    cycling through the mounting surface detecting step and the mounting surface repositioning step until the mounting surface is judged to be parallel to the light-receiving surface in the mounting surface detecting step; and
    mounting the light-receiving unit to the lens unit in such a manner that the mounting surface parallel to the light-receiving surface biases against the mountable surface perpendicular to the optical axis to make the light-sensitive surface be perpendicular to the optical axis of the lens unit.

2. The method as claimed in the claim 1, wherein the mountable surface detecting step comprises the sub-steps of:
    biasing the mountable surface against a standard mounting surface of a standard light-receiving unit, the standard mounting surface being parallel to a light-receiving surface of the standard light-receiving unit;
    directing light from a light source to shine on a shadow casting portion to cast a shadow on the light-receiving surface of the standard light-receiving unit; and
    judging whether the shadow deviates from a standard shadow, the standard image being formed by casting the shadow of the shadow casting portion onto the light-receiving surface of the standard light-receiving unit with a standard lens unit biased against the standard mounting surface, the standard lens unit comprising a standard mountable surface perpendicular to the optical axis thereof;
    if the image is judged to deviate from the standard image, the mountable surface is not perpendicular to the optical axis.

3. The method as claimed in the claim 2, wherein the biasing step comprises sub-steps of:
    fixing the standard light-receiving unit to a holder;
    placing the lens unit onto the standard light-receiving unit in such a manner that the mountable surface of the lens unit is in contact with the standard mounting surface of the standard light-receiving unit; and
    biasing the mountable surface of the lens unit against the standard mounting surface.

4. The method as claimed in the claim 3, wherein at least three ejector pins are used to bias the mountable surface of the lens unit against the standard mounting surface.

5. The method as claimed in the claim 2, wherein the shadow casting portion is made of shaped planar wire and set facing the lens unit.

6. The method as claimed in the claim 2, wherein judging whether the shadow deviates from a standard shadow employs a display device for superimposing a first image with the shadow over a second image with the standard shadow both generated by the light-receiving unit.

7. The method as claimed in the claim 6, wherein the standard shadow is a labeled mark on a corresponding position of the screen of the display device.

8. The method as claimed in the claim 2, wherein the mountable surface repositioning step repositions the mountable surface by attaching at least one washer onto the mountable surface depending the deviation between the shadow and the standard shadow.

9. The method as claimed in the claim 1, wherein the mounting surface detecting step comprises the sub-steps of:
    biasing the mounting surface of the light-receiving unit against a standard mountable surface of a standard lens unit; the standard mountable surface being perpendicular to the optical axis of the standard lens unit;
    directing light from a light source to shine on a shadow casting portion to cast a shadow of an image onto the light-receiving surface of the light-receiving unit, and
    judging whether the image deviates from a standard image, the standard image being formed by casting the shadow casting portion on the light-receiving surface of a standard light-receiving unit with the standard lens unit biased against a standard mounting surface of the standard light-receiving unit, the standard mounting surface parallel to the light-receiving surface thereof;
    if the image is judged to deviate from the standard image, the mounting surface is not perpendicular to the optical axis.

10. The method as claimed in the claim 1, wherein the mounting surface repositioning step repositions the mounting surface by attaching at least one washer onto the mounting surface depending the judging result of the mounting surface detecting step.

11. The method as claimed in the claim 1, wherein the lens unit comprising a lens barrel, the lens barrel defining at least three screw holes in the mountable surface; the light-receiving unit comprising a mounting plate, the mounting plate being sized so as to seal the end of the lens barrel facing the light-receiving unit, the mounting plate defining at least three through holes in the mounting surface, the at least three through holes being aligned with the at least three screw holes.

12. The method as claimed in the claim 11, wherein the mountable surface repositioning step repositions the mountable surface by attaching at least one washer over at least one respective screw hole depending on the detecting result of the mountable surface detecting step.

13. The method as claimed in the claim 11, wherein the mounting surface repositioning step repositions the mounting surface by attaching at least one washer onto at least one respective edge of at least one through hole facing the lens unit depending on detecting result of the mounting surface detecting step.

14. The method as claimed in the claim 11, wherein the mounting step comprises sub-steps of:
  sealing the end of the lens barrel facing the light-receiving unit using the mounting plate; and
  screwing at least three bolts through the at least three through holes and into the at least three screw holes to bias the mounting surface against the mountable surface.

* * * * *